US008111944B2

(12) United States Patent (10) Patent No.: US 8,111,944 B2
Cheng et al. (45) Date of Patent: Feb. 7, 2012

(54) METHOD AND SYSTEM FOR OPTIMIZING WEB PAGE IMAGES

(75) Inventors: Long Cheng, Beijing (CN); Xing Fang, Beijing (CN); Sheng Lu, Beijing (CN); Qing Bo Wang, Beijing (CN); Meng Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1088 days.

(21) Appl. No.: 11/956,655

(22) Filed: Dec. 14, 2007

(65) Prior Publication Data

US 2008/0152260 A1 Jun. 26, 2008

(30) Foreign Application Priority Data

Dec. 15, 2006 (CN) .......................... 2006 1 0169481

(51) Int. Cl.
*G06K 9/36* (2006.01)
(52) U.S. Cl. ...................................................... 382/284
(58) Field of Classification Search .................. 382/284; 345/629, 634, 635
See application file for complete search history.

(56) References Cited

U.S. PATENT DOCUMENTS

| 7,016,977 B1 | 3/2006 | Dunsmoir et al. | |
| 2002/0049777 A1 | 4/2002 | Terayama et al. | |
| 2007/0094588 A1* | 4/2007 | Klassen et al. | 715/501.1 |

FOREIGN PATENT DOCUMENTS

| CN | 1295292 A | 5/2001 |
| CN | 1314634 A | 9/2001 |

OTHER PUBLICATIONS

Luo et al. "Segmenting the Web Document with Document Object Model." Proceedings of the IEEE International Conference on Services Computing, Sep. 15, 2004, pp. 449-452.*

* cited by examiner

*Primary Examiner* — Jon Chang
(74) *Attorney, Agent, or Firm* — Scully, Scott, Murphy & Presser, P.C.; William Stock, Esq.

(57) ABSTRACT

In computer multimedia technology, a system, method and computer program product for optimizing images and transmission of images of a web-page transmitted over the Internet and furthermore, optimizing images of a web page on a network server. The method includes detecting the images in the web page to determine the relationship among the images; in response to the determination of the relationship among the images, combining two or more related images into a combinational image; and updating the web page to replace references to the related images with a reference to the combinational image. By optimizing web page images, the server's work required for handling heavy amount of HTTP requests in transmitting the web page images is decreased and the bandwidth requirement for transmitting the web page images is reduced. The quality of the original image is not lowered. And there is no need to make any change to the operation at the client side.

19 Claims, 8 Drawing Sheets

| Segment | Web Page |
|---|---|
| seg0 | wp0,wp1,wp2 |
| seg1 | wp1 |
| seg2 | wp0,wp2 |
| seg3 | wp3 |
| seg4 | wp0,wp3 |
| seg5 | wp0,wp4 |
| seg6 | wp4 |

FIG. 4

|      | seg0 | seg2 | seg4 | seg5 |
|------|------|------|------|------|
| seg0 | 0    | 1    | 1    | 2    |
| seg2 | 1    | 0    | 1    | 1    |
| seg4 | 1    | 1    | 0    | 1    |
| seg5 | 2    | 1    | 1    | 0    |

FIG. 5A   FIG. 5B

| Image | Segment |
|-------|---------|
| img0  | seg0    |
| img1  | seg0    |
| img2  | seg1    |
| img3  | seg2    |
| img4  | seg3    |
| img5  | seg4    |
| img6  | seg5    |
| img7  | seg5    |
| img8  | seg6    |

FIG. 6

|      | wp0 | wp1 | wp2 | wp3 | wp4 |
|------|-----|-----|-----|-----|-----|
| img0 | 1   | 1   | 1   | 0   | 0   |
| img1 | 1   | 1   | 1   | 0   | 0   |
| img2 | 0   | 1   | 0   | 0   | 0   |
| img3 | 1   | 0   | 1   | 0   | 0   |
| img4 | 0   | 0   | 0   | 1   | 0   |
| img5 | 1   | 0   | 0   | 1   | 0   |
| img6 | 1   | 0   | 0   | 0   | 1   |
| img7 | 1   | 0   | 0   | 0   | 1   |
| img8 | 0   | 0   | 0   | 0   | 1   |

FIG. 7

|      | img0 | img1 | img2 | img3 | img4 | img5 | img6 | img7 | img8 |
|------|------|------|------|------|------|------|------|------|------|
| img0 | 3    | 3    | 1    | 2    | 0    | 1    | 1    | 1    | 0    |
| img1 | 3    | 3    | 1    | 2    | 0    | 1    | 1    | 1    | 0    |
| img2 | 1    | 1    | 1    | 0    | 0    | 0    | 0    | 0    | 0    |
| img3 | 2    | 2    | 0    | 2    | 0    | 1    | 1    | 1    | 0    |
| img4 | 0    | 0    | 0    | 0    | 1    | 1    | 0    | 0    | 0    |
| img5 | 1    | 1    | 0    | 1    | 1    | 2    | 1    | 1    | 0    |
| img6 | 1    | 1    | 0    | 1    | 0    | 1    | 2    | 2    | 1    |
| img7 | 1    | 1    | 0    | 1    | 0    | 1    | 2    | 2    | 1    |
| img8 | 0    | 0    | 0    | 0    | 0    | 0    | 1    | 1    | 1    |

FIG. 8

| Web Page | Visit |
|---|---|
| wp0 | 1000 |
| wp1 | 900 |
| wp2 | 300 |
| wp3 | 400 |
| wp4 | 200 |

FIG. 9

|  | wp0 | wp1 | wp2 | wp3 | wp4 |
|---|---|---|---|---|---|
| img0 | 1000 | 900 | 300 | 0 | 0 |
| img1 | 1000 | 900 | 300 | 0 | 0 |
| img2 | 0 | 900 | 0 | 0 | 0 |
| img3 | 1000 | 0 | 300 | 0 | 0 |
| img4 | 0 | 0 | 0 | 400 | 0 |
| img5 | 1000 | 0 | 0 | 400 | 0 |
| img6 | 1000 | 0 | 0 | 0 | 200 |
| img7 | 1000 | 0 | 0 | 0 | 200 |
| img8 | 0 | 0 | 0 | 0 | 200 |

FIG. 10

|      | img0 | img1 | img2 | img3 | img4 | img5 | img6 | img7 | img8 |
|------|------|------|------|------|------|------|------|------|------|
| img0 | 2200 | 2200 | 900  | 1300 | 0    | 1000 | 1000 | 1000 | 0    |
| img1 | 2200 | 2200 | 900  | 1300 | 0    | 1000 | 1000 | 1000 | 0    |
| img2 | 900  | 900  | 900  | 0    | 0    | 0    | 0    | 0    | 0    |
| img3 | 1300 | 1300 | 0    | 1300 | 0    | 1000 | 1000 | 1000 | 0    |
| img4 | 0    | 0    | 0    | 0    | 400  | 400  | 0    | 0    | 0    |
| img5 | 1000 | 1000 | 0    | 1000 | 400  | 1400 | 1000 | 1000 | 0    |
| img6 | 1000 | 1000 | 0    | 1000 | 0    | 1000 | 1200 | 1200 | 200  |
| img7 | 1000 | 1000 | 0    | 1000 | 0    | 1000 | 1200 | 1200 | 200  |
| img8 | 0    | 0    | 0    | 0    | 0    | 0    | 200  | 200  | 200  |

FIG. 11

| Filename of original image | Filename of combinational image | Position information |
|---|---|---|
| image1.gif. | combine1.gif | 0, 0, 50, 38 |
| image2.gif. | combine1.gif | 50, 0, 50, 38 |
| image3.gif. | combine1.gif | 100, 0, 40, 38 |
| ... | ... | ... |

FIG. 12

```
<html>
<head>
<title>IMGs</title>
</head>
<body>
<b> Look at these images. </b> <br>
<IMG SRC="image1.gif" BORDER="0" >
<IMG SRC="image2.gif" BORDER="0" >
<IMG SRC="image3.gif" BORDER="0" >
</body>
</html>
```

FIG. 13A

```
<html>
<head>
<title>IMGs</title>
<style type="text/oss">
<1--
.style1 {
   width: 50px;
   height: 38px;
   background-image: url(combine1.gif);
   background-position: 0px 0px;
}

.style2 {
   width: 50px;
   height: 38px;
   background-image: url (combine1.gif);
   background-position: -50px 0px;
}
-->
</style>
</head>
<body>
<b> Look at these images. </b> <br>
<IMG class="style1" SRC="transparent.gif" BORDER="0" >
<IMG class="style2" SRC="transparent.gif" BORDER="0" >
<IMG style = "width: 40px; height: 38px;
         background-image: url(combine1.gif);
         background-position: -100px 0px;"
         SRC="transparent.gif" BORDER="0" >
</body>
</html>
```

METHOD AND SYSTEM FOR OPTIMIZING WEB PAGE IMAGES

FIELD OF INVENTION

The invention relates to computer multimedia technology, in particular, to optimization of images of a web-page transmitted over the Internet.

BACKGROUND ARTS

With the popularization and development of the Internet technology, multimedia technologies are increasingly used by Internet applications to render Web pages, in order to improve the user experience. A Web page generally contains many images. The size of most images is usually relatively small, for example, less than 1 Kb. In an example web page shown at the left side of FIG. 1, three images, "CHILD", "MOUSE" and "PET", are included. The three images, "CHILD", "MOUSE" and "PET", are represented by three files, for example, files "image1.gif", "image2.gif" and "image3.gif" as shown at upper right of FIG. 1. To display the web page, the three image files will be individually referenced. Image resources are deployed on a server in the networks. When a client requests to the server for a web page, each image in the web page will initiate a HTTP link and occupy certain amount of network bandwidth. For each image, HTTP request and response header have to be processed and transmitted. Too many images in a web page would not only cost network bandwidth and influence transmission speed, but also increase the amount of work of the server.

US patent application (Publication No. 2004/0120589 A1) discloses a method for accelerating transmission of image data. According to the method, a network apparatus is set up between the remote client and the network server for converting the data received from the network server; then the changed data is transmitted to the remote client. The network apparatus transforms the image data into a smaller version of different format and with a decreased number of colors. Although the method can accelerate the transmission of image data, the quality of the image transmitted can be negatively influenced.

SUMMARY OF THE INVENTION

One of the objects of the invention is to decrease the work amount of the server in transmitting web page images, while the quality of the web page images is not lowered.

Another one of the objects of the invention is to decrease the bandwidth requirement for transmitting web page images.

According to one aspect of the invention, there is provided a method for optimizing images of a web page on the network server, comprising the following steps:

Detecting the images in the web page to determine the relationship among the images;

In response to the determination of the relationship among the images, combining two or more related images into a combinational image; and Updating the web page to replace references to the related images with a reference to the combinational image.

According to another aspect of the invention, there is provided a system for optimizing images of a web page on the network server, comprising:

Image detection means for detecting the images in the web page to determine the relationship among the images;

Image combination means for combining two or more related images into a combinational image in response to the determination of the relationship among the images; and Web page updating means for updating the web page to replace references to the related images with a reference to the combinational image.

According to still another aspect of the invention, there is provided a computer program product comprising program codes embodied on computer readable medium which, when executed by a computer, implement the method of the invention.

The inventive method and system, by merging of images in the web page at the server side in advance, may reduce the number of image files to be transmitted and reduce the processing for transmitted requests and responsive headers process accordingly. Therefore, the amount of work by the server in transmitting web page images as well as the bandwidth requirement for transmitting web page images is lowered.

BRIEF DESCRIPTION OF THE DRAWINGS

The above and other features of the invention will become obvious in the following description of detailed embodiment with reference to the following figures, wherein FIG. 1 illustratively shows the manner of referencing to individual images in the prior art and the manner of referencing to the combinational image according to the invention.

DETAILED EMBODIMENTS

Figure 2:
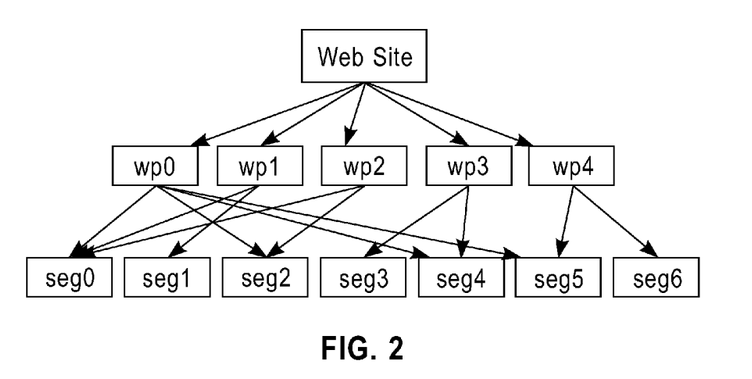
FIG. 2 illustrates the resource structure relationship of an example of web site.

Detailed embodiments of the invention will be described below with reference to the drawings. FIG. 2 illustrates the resource structure relationship of an example web site. For the sake of brevity, only five web pages, wp0-wp4, are shown in FIG. 2. A website may contain many web pages. In the embodiments of the present invention, the web page is described with documents in markup languages (such as HTML, XML, etc.). Each web page may consist of one document or a plurality of documents referred to as segments. For brevity and consistency, the term web page in the following description shall refer to the web page described with HTML documents.

In the HTML document describing the web page, an image to be displayed is represented by referring to a corresponded image file (for example, but not limited to, a .gif file). A web page document typically needs to refer to a number of image files.

Figure 1:
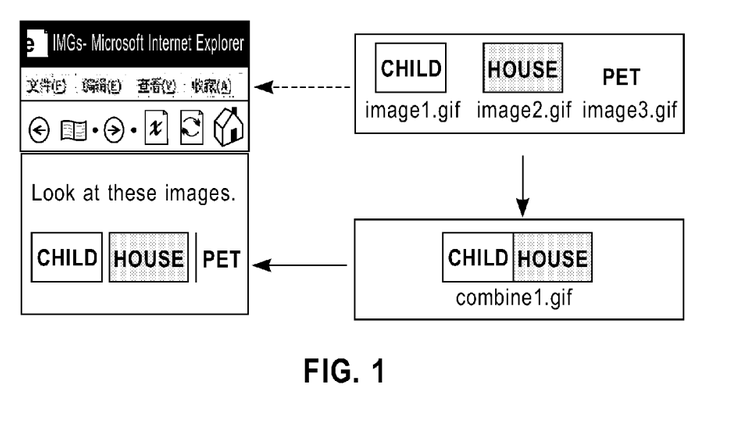

The basic concept of optimizing web page images according to this invention is illustrated in FIG. 1, which shows that several small related images, shown at the top right, included in the web page are combined into a single image file "combine1.gif" as shown at the down right. In this way, when the web page is requested by the client side, only the single file for the combinational image is downloaded instead of the individual small images.

The method of optimizing web-page images according to the invention generally comprises the following phases:

In the first phase, the images in the webpage will be detected to determine their relationship. In this phase, it may be selected to detect static image relationship and dynamic image relationship. The static image relationship includes DOM (Document Object Model) tree based image distance relationship and image inclusion relationship. The dynamic image relationship includes the relationship among images with respect to their being commonly referenced by different web pages at the segment level or the webpage level.

In the second phase, in response to the determination of the image relationship, two or more related images are combinational image into a combinational image. It may be selected to perform DOM tree based image combination, image combination at the segment level, image combination at the webpage level or image combination at the web site level.

In the third phase, references to the related images are replaced with the reference to the combinational image. During the third phase, in response to the result of the image combination in the second phase, the code with references to individual images in the original webpage document will be replaced by the code with references to the combinational image containing the individual images.

In the following, embodiments of various implementations of the first phase will be described.

The distance between web-page images may be used to characterize the relationship between the images. The image distance may be divided into spatial distance and temporal distance. The spatial distance of two images characterizes the possibility of their being displayed in the same view; the closer the spatial distance of two images is, the bigger is the possibility of their being displayed in the same view. The temporal distance of two images characterizes the possibility of their being displayed one after another in a short time interval; the closer the temporal distance of two images is, the bigger is the possibility of their being displayed one after another in a short time interval. The spatial distance and the temporal distance is related to each other and is different as well. For example, if two images are always displayed in the same view, then both their spatial distance and temporal distance are small. But large spatial distance does not mean big temporal distance. That is because two images that are never displayed in the same view may well be located in two linked web-pages respectively and therefore may be displayed sequentially one after another in a short time interval. According to the invention, a couple of small images included in a web page can be combined into a single image file, and the combination may be performed on the basis of the distance between the images so as to raise the efficiency in using the combinational image.

According to an embodiment of the invention, detecting images in a web page comprises detecting the relationship of image distance on the basis of the DOM tree.

Figure 3A:
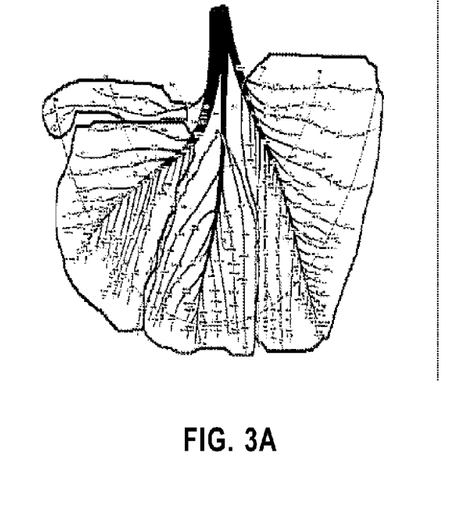
FIGS. 3a and 3b illustratively show a DOM tree.

FIG. 3a illustratively shows a DOM tree. A DOM tree is a structural description of a HTML or XML document. Each segment of a web page may be described by a HTML document, and thus may be represented by a DOM tree as shown in FIG. 3a.

Figure 3B:
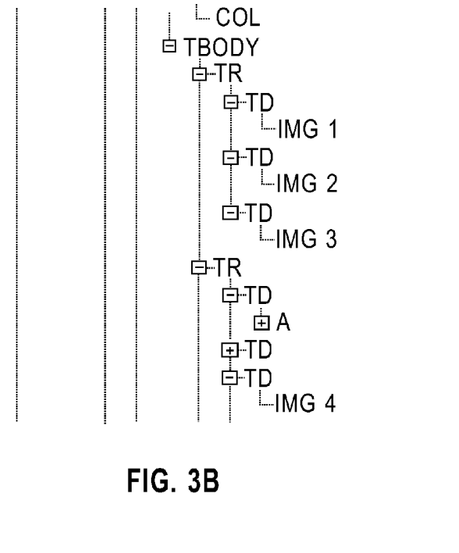

According to the invention, such a DOM tree may be changed to a reduced DOM tree in which branches not containing image node are omitted while adequate structural information is reserved. FIG. 3b is a DOM tree representing segments of a web page rebuilt according to an embodiment of the invention. Represented in the tree are two branches containing image leaf nodes, one containing three images IMG1, IMG2 and IMG3, and another containing one image IMG4.

According to the invention, the relationship of images in the webpage may be detected, by detecting the relative distance of image leaf nodes in the reduced DOM tree, for use in combining images in the second phase. The result of the detection may also be stored in a table of image node distance relationship, in which values representing distances of each image leaf node with respect to each of other image leaf node are listed. For example, in FIG. 3b, the distance of IMG1 and IMG2 is 1, and the distance of IMG1 and IMG3 is 2. Generally speaking, the closer the distance of two images is, the bigger is the possibility that they have relatively close spatial distance or temporal distance. In the second phase, if images are combinational image or merged according to the distance of images, prioritizing the combination and merge of images having shorter distance, then the efficiency will be raised. In the following, it will be described how to combine images according to their distance relationship.

According to an embodiment of the invention, detecting images of the webpage includes detecting the image inclusion relationship, for example, the relationship of detecting the relationship of the images being commonly referenced by different segments.

Figure 4:
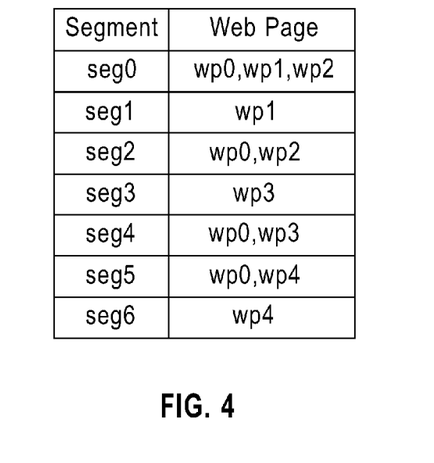
FIG. 4 is an example of table showing the relationship between the webpage and the segment.

FIG. 4 is an example of table showing the relationship between the webpage and the segment. The table represents the relationship of the webpage and the segment in another way. For example, from the table it can be see that the segment seg1 is included in the webpage wp1, and the segment seg4 is included in two webpages wp0 and wp3, etc.

Figure 5A:
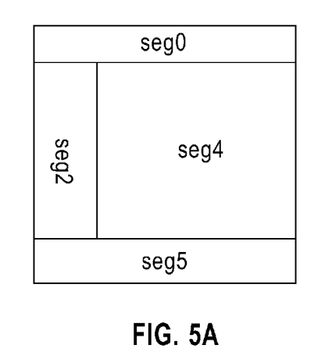
FIGS. 5a and 5b are examples of the segment layout of a web page structure.

FIG. 5a is an example of the segment layout of a webpage structure. The webpage includes different portions or sections seg0, seg2, seg4, seg5. For ease of description, such a section is referred to as "segment". In the HTML document describing the webpage, each segment may be described by a HTML document. It is needed to note that, the division of the segment is relative. A relatively large HTML document may represent a relative large section of the webpage, and one HTML document may comprise many smaller HTML documents each representing a relatively small portion in the webpage.

Figure 5B:
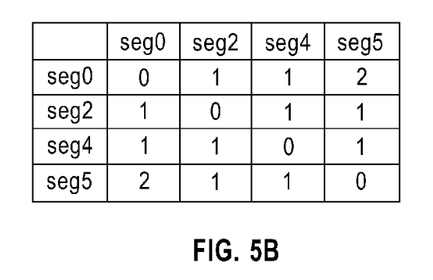

HTML documents are structural and use tags to present contents. Therefore, the contents can be detected with programmed methods to detect various relationships of segments in the webpage. FIG. 5b shows an example of the relationship of segments, i.e., the spatial relationship of the segments in the webpage shown in FIG. 5a. The relationship value in the table of FIG. 5b represents the distance of segments. For example, in the webpage shown in FIG. 5a, the distance between seg0 and seg2 and the distance between seg0 and seg4 are 1, while the distance between seg0 and seg5 is 2. Those skilled in the art know that there are various tools and methods for detecting webpages described by HTML documents; and there exist various similar detecting methods for webpages written in different programming languages. Those tools and methods are not within the scope of the invention and will not be described in detail.

Figure 6:
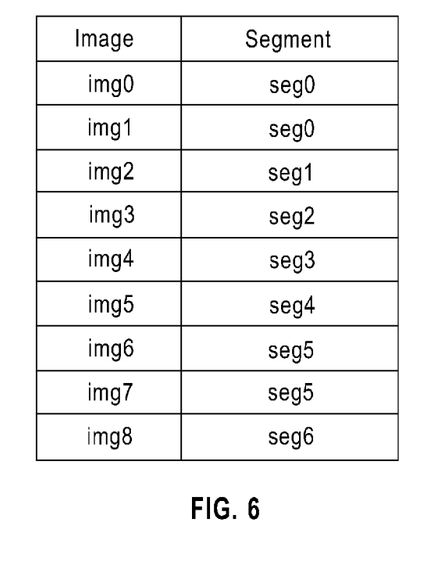
FIG. 6 is an example of table showing the relationship of the segment and the image.

Analyzing a webpage may also comprise detecting the relationship of the segment and the image in the webpage. FIG. 6 is an example of table showing the relationship of the segment and the image. It is used to show which images are referenced by which segments. The table shows that, for example, image img0 is referenced by segment seg0, and both images img6 and img7 are referenced by segment seg5, etc.

It is to be noted that, due to the nature of HTML documents, it is easy to write analysis program and derive the tables of FIG. 4 and FIG. 6 by running the program.

Figure 7:
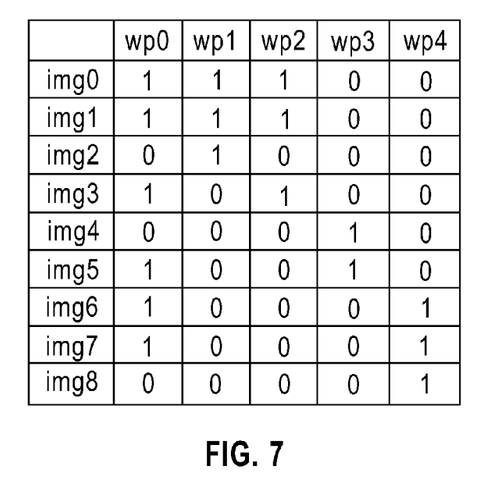
FIG. 7 is an example of table showing the relationship between the image and the web page.

With FIG. 4 showing the relationship between the webpage and the segment and FIG. 6 showing the relationship between the segment and the image, the relationship between the image and the webpage can be derived, as shown in the table of FIG. 7 that represents the relationship between the image and the webpage. For example, image img0 is referenced by segment seg0 (FIG. 6) and segment seg0 is included in webpage wp0 (FIG. 4), so image img0 is referenced by webpage wp0. Similarly, image img3 is referenced by segment seg2 (FIG. 6) and segment seg2 is included in webpages wp0 and wp2 (FIG. 4), so image img3 is referenced by webpages wp0 and wp2. From FIG. 7 it can be seen that webpage wp1 references images im0, img1 and img2; and webpage wp3 references images img4 and img5.

Generally speaking, the probability of images in the same webpage being fetched at the same time is relatively high. Because the segment is portion of the webpage, it can be said that the probability of images in the same segment being fetched at the same time is relatively high.

Figure 8:
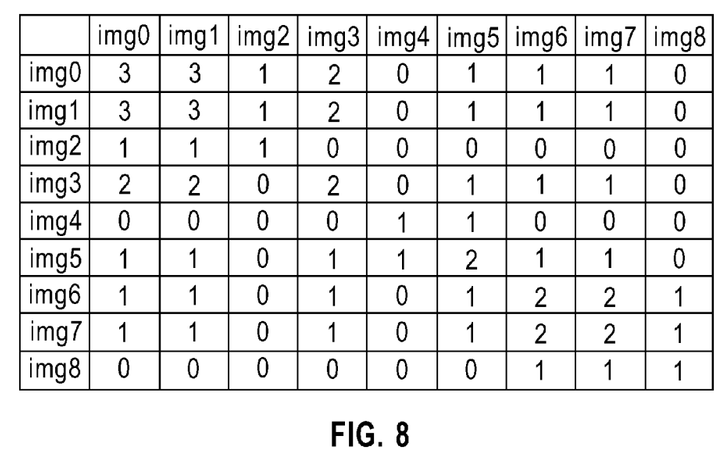
FIG. 8 is an example showing the relationship between images.

By analyzing the table of FIG. 7, the table of FIG. 8 can be derived to show the relationship of images with respect to the webpage. In the table of FIG. 8, the number R[x,y] in row x and column y is referred to as "number of common webpages" and denotes that image x and image y are commonly referenced by R[x,y] webpage(s). For example, the number R[6,7]=2 in row 6 and column 7 denotes that image img6 and image img7 are commonly referenced by two webpages; in other words, there are two webpages that reference img6 as well as img7. R[6,8]=1 denotes that image img6 and image img8 are commonly referenced by one webpage, or there is only one webpage that references not only img6 but also img8. Comparatively, the probability of images img6 and img7 being fetched by one single webpage at the same time is higher than the probability of images img6 and img8 being fetched at the same time. Therefore, if images img6 and img7 are merged with higher priority, the efficiency would be higher.

FIG. 8 can also be derived by traversing a tree structure similar to FIG. 2. That is with the scope of the prior art and thus is not detailed here.

It is to be noted that the segment is the subset of the webpage. Therefore, in similar ways, the relationship of images with respect to the segment can be derived; in other words, different images being commonly referenced by several segments may be analyzed. In one embodiment, the same FIG. 8 may also be used to denote the relationship of images with respect to the segment. Now, the number R[x,y] in row x and column y is referred to as "number of common segments" and denotes that image x and image y are commonly referenced by R[x,y] segment(s). Specifically, the number R[6,7] =2 in row 6 and column 7 denotes that both image img6 and image img7 are commonly referenced by two segments; R[6, 8]=1 denotes that there is only one segment that references both image img6 and image img8. Comparatively, the probability of images img6 and img7 being fetched by one single segment at the same time is higher than the probability of images img6 and img8 being fetched at the same time. Therefore, if images img6 and img7 are given higher priority to be merged, the efficiency would be higher.

The image detections as performed in the above involve the detection of static relationship of images.

According to statistics, 90% of server requests involve 2-4% files in the website. The fact that an image is referenced by multiple web pages does not necessarily mean that the image is accessed frequently. In a different accessing pattern (or access mode), the frequency at which the webpage is accessed is different, so is the frequency at which the image is accessed. In such cases, the dynamic relationship of images with respect to the webpage is different to the static relationship.

In another embodiment of the invention, the dynamic relationship of images, or the relationship of images being dynamically referenced by different webpages, can be further detected. According to the embodiment, information on the webpage is firstly collected using monitoring and logging tools as existing techniques to derive the data illustratively shown in FIG. 9, which shows the number of times each web page in FIG. 7 is visited or accessed in a certain period and reflects the dynamic pattern of webpage accessing.

Figure 9:
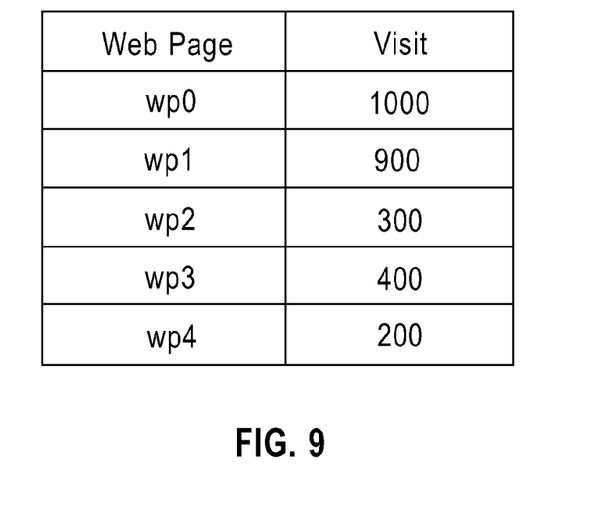
FIG. 9 shows the number of times each web page in FIG. 7 is visited.
Figure 10:
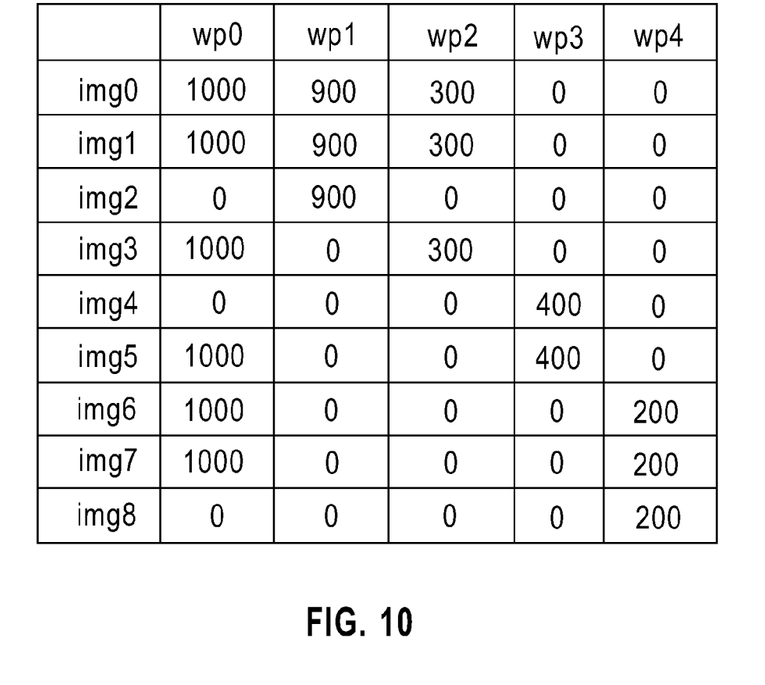
FIG. 10 shows the number of times each image in FIG. 7 is visited.
Figure 11:
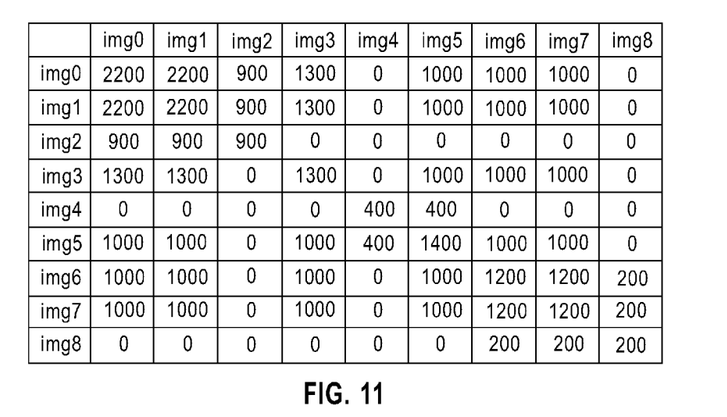
FIG. 11 shows a table of image relationships which are weighted by the number of accesses.

By multiplying the two matrices as shown in FIG. 7 and FIG. 9 respectively, the matrix of FIG. 10 can be obtained which shows the number of times each image in FIG. 7 is visited in a certain period of time. By multiplying the matrix of FIG. 10 and the matrix of FIG. 7, a table as shown in FIG. 11 is obtained, which shows the dynamic relationship of images as weighted by die number of times that the webpage is accessed. In FIG. 11, the relationship of any two images x and y may be measured by the "similarity measure of image accessing pattern", denoted as S(x,y) which can be derived from the number R[x,y] in row x and column y: for images x1,x2,x3, if $$|R[x1,x1]-R[x1,x2]|<|R[x1,x1]-R[x1,x3]|$$

then S(x1,x2)>S(x1,x3).

For a given set of images, the similarity measure of image accessing pattern of each of all pairs of images may be calculated, and compared with each other with respect to relative magnitude.

For example, from FIG. 10 it can be derived that S(0,1)>S (0,7), which means that the probability that images img0 and img1 will be fetched or accessed at the same time is higher than that for images img0 and img7. Therefore, giving priority to merging of images img0 and img1 will result in higher efficiency.

In the following, implementations of the second phase will be described. In this phase, DOM tree based image combination, image combination at the segment level, image combination at the webpage level and image combination at the website level may be performed.

First, the method of combining images will be described by way of example.

It is assumed that two images image1 and image2 are to be combined.

As the first step, a combinational image comprising the image image1 is created. First, a blank image file combine1.gif of designated size is created, and the image image1 is pasted to the blank area in such a way that the remaining blank area is the largest. Then the corresponding relationship of the image image1 and the combinational image combine1.gif is recorded. For example, the table of corresponding relationship of image-combinational image in the FIG. 12 contains file names of the image image1 and the combinational image combine1, and position information of the image image1 in the combinational image combine1.

Figure 12:
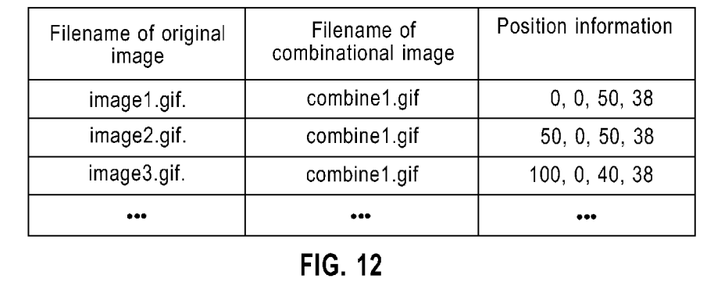
FIG. 12 is an example of the table showing the corresponding relationship between images and combinational images.

The example table shown in FIG. 12 is used to represent the relationship of each of combined original images and the corresponding combinational image. For example, in the first line, "image1.gif" and "combine1.gif" are respectively file names of the combined original image image1 and the combinational image combine1. "0,0,50,38" is the position information of the image image1 in the combinational image combine1, meaning that the rectangular image image1 is 50 in width and 38 in height, and the upper left corner is at the position of [0,0] (upper left corner) of the combinational image combine1.

As the second step, the image image2 is pasted to the combinational image combine1. First, it is judged whether the remaining blank area in the combinational image combine1 can accommodate the image image2. If yes, the image image2 is pasted to the position adjacent to the image image1 in the remaining blank area, and the corresponding relationship of the image image2 and the combinational image combine1.gif is recorded as shown in the second row of FIG. 12. For example, the table of corresponding relationship of image-combinational image in the FIG. 12 contains the file names of the image image1 and the combinational image combine1, and the position information of the image image1 in the combinational image combine1. However, if the remaining blank area in the combinational image combine1 can not accommodate the image image2, then the image image2 is not pasted.

If three images are to be merged, for example, if another image image3 is to be combined with image image1 and image image2, then repeat the second step in the above for the image image3.

As shown in the third row of the example table of FIG. 12, image image2 is merged to the right of image image1 in the combinational image combine1, and image image3 is merged to the right of image image2 in the combinational image combine1. More images can be combined in similar way.

It is to be noted that the above steps are only illustrative examples of the method for combining images, but the invention is not limited to them. For example, the position information of the original image in the combinational image is expressed by coordinates, e.g., the height and width of the original image in the above example, but the position information can also be expressed in other ways. Those skilled in the particularly programmers, may flexibly implement those and other details. Any method for merging multiple images into a large combinational one may be applied to implement the invention.

According to one embodiment of the invention, DOM tree based image combination may be performed on the basis of detection of distance relationship of image nodes of the reduced DOM tree in the first phase. As previously discussed, the detection of distance relationship of image nodes of the reduced DOM tree in the first phase may result in a table of distance relationship of image nodes. The embodiment may perform image combination based on the relationship of images with respect to their distances in the DOM tree. For example, the images with shorter distance are combined together before the images with longer distance are combined. In the following, detailed steps of this kind of image combination will be described by examples.

Step (1), set a size threshold for the combinational image, for example, 5K bytes. In theory, the inventive technical solution of combining webpage images is not restricted by the size of the combinational image. But in practice, the size of the combinational image is preferably restricted within a suitable range. That is because although combining small images into large image may reduce the number of images to be processed, a too large combinational image would spend too much time in HTTP packet transmission, thereby decreasing the speed of the transmission of the combinational image. Therefore, a threshold for the size of the combinational image is set. In specific implementations, the threshold is dependent on the status of the network and past experiences. Apart from the number of bytes of the file size, the size threshold of the combinational image may be represented in other ways. For example, the dimension of the combinational image may be used to represent the threshold. The size of the combinational image may be restricted by restricting the number of combined images.

Step (2), set the value of the initial distance of the image node D=1.

Step (3), from the "table of distance relationship of image nodes" as described in the above, select all uncombined images that have a distance of D with another image node.

Step (4), for any one from the set of the uncombined images, e.g., image1, if there is another image image2 in the set and the sum of the sizes of image image1 and image image2 does not exceed the threshold, then the images image1 and image2 will be combined into a combinational image; otherwise, step (6) will be performed.

Step (5), repeat the following: if there is another image image3 in the set and the sum of the size of image image3 and the size of the combinational image does not exceed the threshold, then the image image3 is combined into the combinational image; otherwise, step (4) will be performed.

Step (6), increase the distance value D by one, and return to Step (2).

In the process of combining images as the above, a table of corresponding relationship of the image and the combinational image as shown in FIG. 12 may be generated as previously described.

According to another embodiment, a threshold for the distance value D may be optionally set. If the distance value D reaches the threshold, no image combination will be performed.

Through the above steps, images of shorter distance will be combined with priority and it is more likely that the combined images have relatively close spatial distance or temporal distance, thus the efficiency of the combinational image is higher.

According to another embodiment of the invention, the DOM tree based image combination may be conducted directly as follows: Starting from any one of image leaf nodes, traverse the DOM tree and combine nearby images into combinational images and generate the table of corresponding relationship of the image and the combinational image. The merging or combining method is similar to the combining method according to the table of image node distance relationship as described in the above, and the threshold may also be employed to limit the size of the combinational images.

There are various algorithms for traversing the DOM tree, for example, the depth-first algorithms. They all may be employed to perform this kind of image combination and are not described in details here.

According to another embodiment of the invention, image combination at the segment level may be conducted. The segment level image combination may be conducted according to the relationship of images with respect to the segment as determined in the detection in the first phase. As shown in FIG. 8, the relationship of images with respect to the segment can be characterized by the "number of common segments" R[x,y] which denotes the degree to which two images x and y are commonly referenced by multiple segments.

According to one embodiment, image combination for images in a webpage is performed according to the high-to-low order of their probabilities of being commonly referenced by different segments as the following:

Step (1), set a size threshold for the combinational image.

Step (2), according to the high-to-low order of "number of common segments" R[x,y], repeatedly perform the following operations for any image that has not been combined yet:

If the sum of the size of an image x associated with the R[x,y] and the size of another associated image y does not exceed the threshold, then combine the images x and y into a combinational image;

If the sum of the size of an image x associated with the R[x,y] and the sizes of other images that have already been combined does not exceed the threshold, then combine the image x with the combinational image that comprises the other images.

The concept of "threshold" and the operation of combining images are the same as those describe previously. The output result is, for example, a table of corresponding relationship of the image and the combinational image.

As already discussed, if FIG. 8 is taken for an example relationship of images with respect to the segment, then the "number of common segments" R[6,7]=2 is great than the "number of common segments" R[6,8]=1. So images img6 and img7 are given higher priority to be merged than images img6 and img8, and the efficiency for the generated combinational image would be higher. If the images img6 and img7 have already been combined, and the sum of the size of image img8 and the sizes of images img6 and img7 is not greater than a predefined threshold, then image img8 could finally be combined with images img6 and img7.

According another embodiment of the invention, image combination at the webpage level may be performed in the second phase.

In this embodiment, the webpage level image combination may be performed according to the relationship of images with respect to the webpage as determined in the detection in the first phase. Again, the table shown in FIG. 8 is used to show the relationship of images with respect to the webpage. Now the relationship can be characterized by the "number of common webpages" R[x,y] which denotes the degree to which two images x and y are commonly referenced by multiple webpages.

According to one embodiment, image combination for images in a webpage is performed according to the high-to-low order of their probabilities of being commonly referenced by different webpages with the following steps:

Set a size threshold for the combinational image;

According to the high-to-low order of "number of common webpages" R[x,y], repeatedly perform the following operations per image that has not been combined:

If the sum of the size of an image x associated with the R[x,y] and the size of another associated image y does not exceed the threshold, then combine the images x and y into a combinational image;

If the sum of the size of an image x associated with the R[x,y] and the sizes of other images that have already been combined does not exceed the threshold, then combine the image x with the combinational image that comprises the other images.

The concept of "threshold" and the operation of combining images are the same as those describe previously. The output result is, for example, a table of corresponding relationship of the image and the combinational image.

Obviously, the steps for webpage level image combination is very similar those for segment level image combination. The output result for example, could also be a table of corresponding relationship of the image and the combinational image, with similar effects. In other words, if FIG. 8 is taken for an example relationship of images with respect to the webpage, then images img6 and img7 are given higher priority to be merged than images img6 and img8.

According to one embodiment of the invention, image combination is performed at the website level. The combination features in prioritizing the combination of images that have similar accessing patterns. The website level image combination is to combine images according to their dynamic relationship. As is described with reference to FIG. 11, the dynamic relationship of two images x and y can be characterized by a "similarity measure of image accessing pattern" denoted as S[x,y].

In one embodiment of the invention, image combination for images in a webpage is performed according to the high-to-low order of similarity measure of image accessing pattern as the following steps:

Set a size threshold for the combinational image;

According to the high-to-low order of similarity measure of image accessing pattern" S[x,y], repeatedly perform the following operations per image that has not been combined:

If the sum of the size of an image x associated with the S[x,y] and the size of another associated image y does not exceed the threshold, then combine the images x and y into a combinational image;

If the sum of the size of an image x associated with the S[x,y] and the sizes of other combined images does not exceed the threshold, then combine the image x with the combinational image that comprises the other combined images.

The steps of the website level image combination are very similar to the webpage level image combination and the segment level image combination, and the output result is also, for example, a table of corresponding relationship of the image and the combinational image.

The various detections of image relationship in the first phase may be performed separately or in combination. Correspondingly, the image combination in the second phase may be performed based on results of either the separate detection or the combinational detection.

According to the invention, after the images in the webpage are combined into the combinational image in the second phase, the third phase will be initiated on the result of the second phase to update the webpage to replace references to the images with the reference to the combinational image.

Figure 13A:
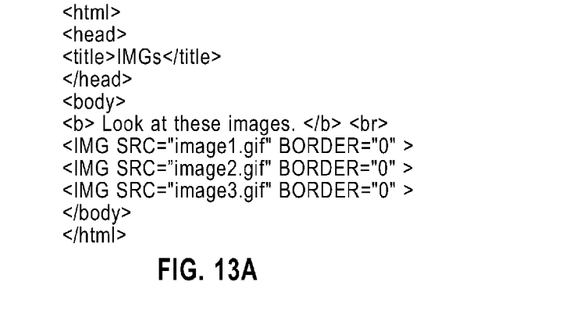
FIG. 13a is an example section of original HTML document containing images to be displayed.

In the HTML document describing the webpage, the reference to each of original images and the displaying position of the original image in the webpage are tagged. FIG. 13a is an example section of original HTML document containing images to be displayed. In the example HTML document, the code sections that make reference to the original images image1, image2 and image3 can be respectively expressed in pseudo code as the following:

"display the picture of the file 'image1.gif' at position A in the webpage";

"display the picture of the file 'image2.gif' at position B in the webpage";

"display the picture of the Me 'image3.gif' at position C in the webpage";

According to one embodiment of the invention, the corresponding relationship of original images and combinational image recorded when the combinational image is generated in the second phase is employed to replace the reference to the file of each original image in the webpage document with references to the file of the combinational image and to the position information of the related original image in the combinational image. For example, using the corresponding relationship of the image image1 and the combinational image combine1 as represented in the table of corresponding relationship of images and combinational image illustrated in FIG. 12, the above code section in the HTML document that makes reference to the original image image1 is replaced with a code section represented by the following pseudo code:

"At position A of the webpage, use the portion of picture in the combinational image combine1.gif indicated by the position information [0,0,50,38] as the background picture; At the position A, use a transparent picture as the current picture". In the above pseudo code, the character "A" denotes the position already determined in the original HTML document, where the image image1 is to be displayed. The "A" is already embodied in the original HTML document.

In a similar fashion, the code sections in the HTML document that makes respective reference to the original images image2 and image3 are replaced with by the following, respectively:

"At position B of the webpage, use the portion of picture in the combinational image combine1.gif indicated by the position information [50,0,50,38] as the background picture; At the position B, use a transparent picture as the current picture"; and "At position C of the webpage, use the portion of picture in the combinational image combine1.gif indicated by the position information [100,0,40,38] as the background picture; At the position C, use a transparent picture as the current picture".

Figure 13B:
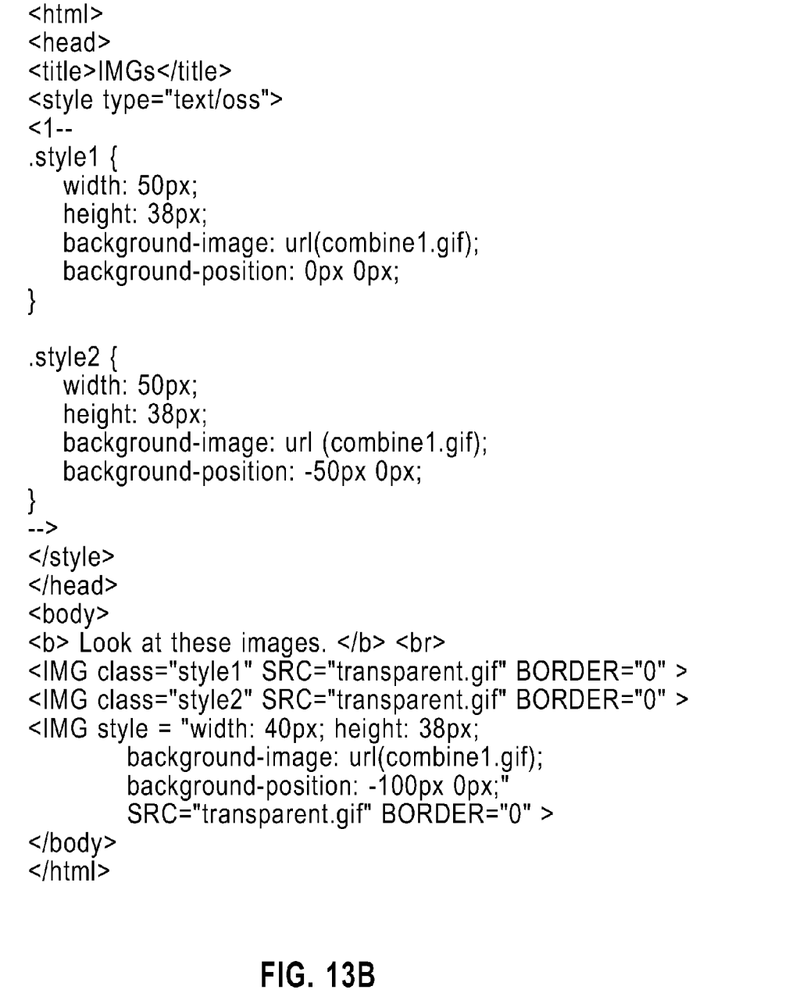
FIG. 13b is an example of HTML document updated according to the invention.

FIG. 13b is an example of HTML document that has been updated, wherein the code for separately displaying the combinational image have been used to replace the original code for displaying related original images. This kind of replacement can be done automatically through appropriate programming.

After the original HTML document is updated, if three images image1, image2 and image3 (as shown in FIG. 1) are to be displayed on the browser at the client side at the same time, there is no need for the client side to request for three image files image1.gif, image2.gif and image3.gif. It is adequate to request for a single image file combine1.gif. The browser at the client side would parse the updated HTML document that corresponds to the original HTML document. Hence, the references to multiple files of small original images (e.g., as shown at the upper right of FIG. 1) become the reference to fewer combinational image files (e.g., as shown at the bottom right of FIG. 1).

Figure 14:
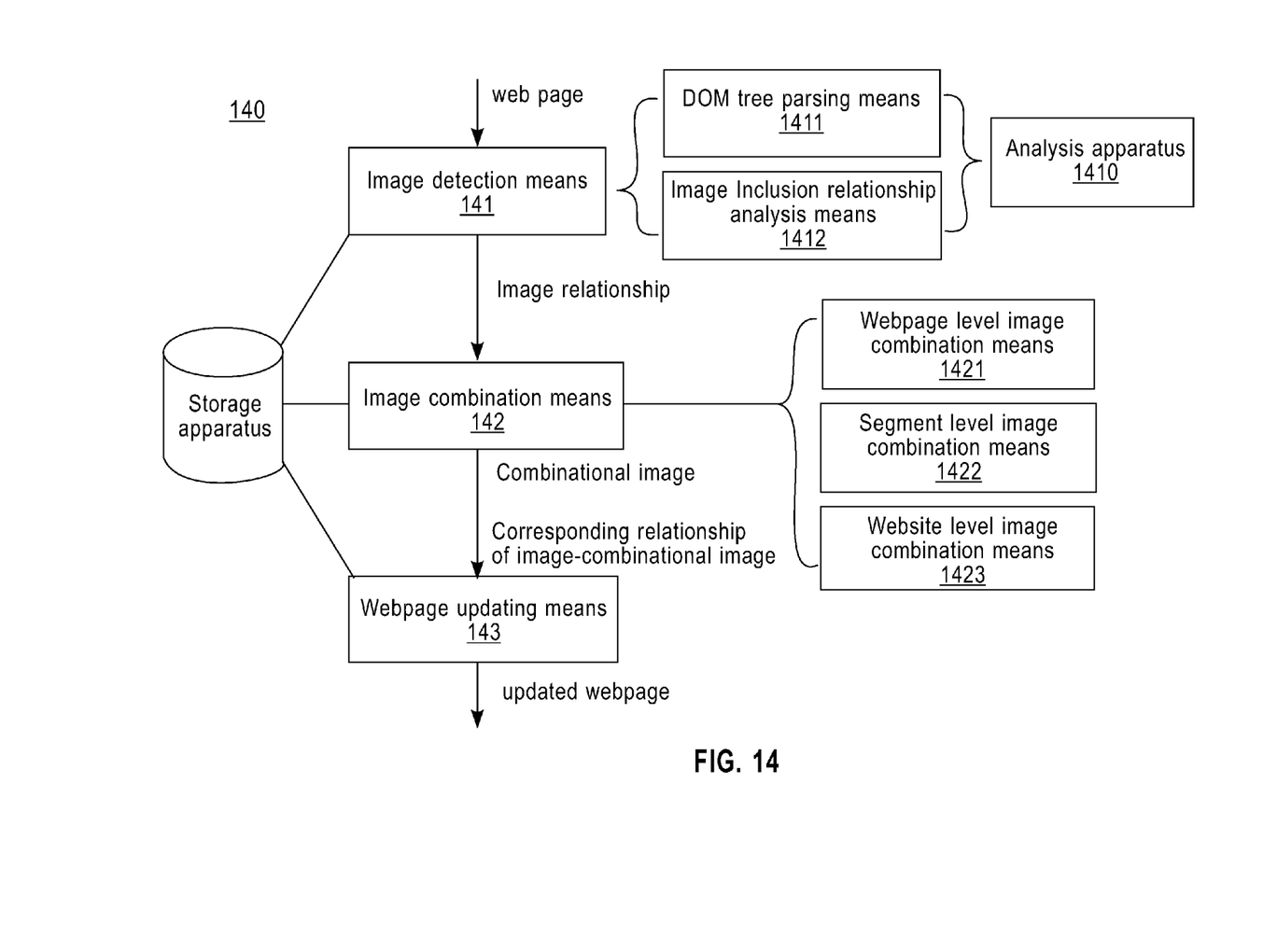
FIG. 14 is a block diagram of the system for optimizing web-page images according to an embodiment of the invention.

FIG. 14 is a block diagram of the system for optimizing web-page images according to an embodiment of the invention. As shown in FIG. 14, the system 140 according to the embodiment comprises: image detection means 141, for detecting the images in the web page to determine the relationship among the images; image combination means 142, for combining two or more related images into a combinational image in response to the determination of the relationship among the images; and web page updating means 143, for updating the web page to replace references to said related images with a reference to the combinational image. From FIG. 14, it can be seen that the image detection means 141 is input with web pages and outputs the result of the detection of image relationship, for example, the table of image relationship as shown in FIG. 8. The detection result may be stored in a storage apparatus or fed directly to the image combination means 142. The image combination means 142 combines related images into combinational image based on the detection result output by the image detection means 141, and store or output the relationship of the combined image and the combinational image, for example, the file name of the combined image, the file name of the combinational image and the position information of the combined image in the combinational image. The web page updating means 143, on the basis of the output from the image combination means 142, changes the references to files of related images to references to the file of the combinational image and the position information of the related images in the combinational image.

Optionally, the system 140 may comprise a storage apparatus for storing the output data generated by any one of all of the image detection means 141, the image combination means 142 and the web page updating means 142, and for providing input data to the above apparatuses.

As shown in FIG. 14, according to an embodiment of the invention, the image detection means 141 may comprise DOM tree parsing means 1411 and/or image inclusion relationship analysis means 1412. The DOM tree parsing means 1411 is used for analyzing the structure of the web page, while the image inclusion relationship analysis means 1412 is used for analyzing and recording the relationship of the webpage images with respect to their being commonly referenced according to the inventive method. In practical implementations, the DOM tree parsing means 1411 and the image inclusion relationship analysis means 1412 may be independent with each other, or they may embodied as a single analysis apparatus 1410 for analyzing the structure of the web page according to the inventive method.

According to an embodiment of the invention, the image combination means 142 is configured to combine nearby images into a combinational image through traversing a DOM tree representative of web pages.

According to an embodiment of the invention, the image combination means 142 may comprise webpage level image combination means 1421, segment level image combination means 1422 and website level image combination means 1423. The webpage level image combination means 1421 is used for combining images according to their relationship of being commonly referenced by different webpages; the segment level image combination means 1422 is used for combining images according to their relationship of being commonly referenced by different segment of the same webpage; and the website level image combination means 1423 is used for combining images according to their relationship of similarity of image accessing pattern. In specific implementations, the image combination means 142 may comprise only a part of the above three means depending on requirements.

According to an embodiment of the invention, the image combination means 142 is further configured to combine related images into a combinational image according to the high-to-low order of their probabilities of being commonly referenced and/or according to the high-to-low order of similarity of image accessing pattern, and/or to combine images according to the distance between the images in the DOM tree by combining the images with shorter distance before combining the images with longer distance.

According to an embodiment of the invention, a size threshold of combinational image is predefined for the image combination means 142 to perform image combination. The choice of the threshold may depend on specific implementations. For tow or more related images, the image combination means 142 combines them to form a combinational image or merges one of them into a combinational image only when the sum of their sizes does not exceed the threshold.

The system 140, as well as each of its components of the embodiments, corresponds to the method for optimizing webpage images described previously, and they belong to a same inventive concept. However, the implementation of the inventive system for optimizing webpage images is not limited to the above structure. The system 140 and its components may be implemented not only by hardware circuits such as logic chips and programmable devices, but also by various processors executing corresponded software. For example, they may be provided in the form computer program product comprising program codes that perform the steps of the inventive method, or implemented by the combination of the above software and hardware. The components may be integrated together, or physically independent but operationally cooperative with each other.

By optimizing webpage images, the inventive method and system may reduce the work amount of the server to handle large amount of HTTP requests in transmitting web pages, and decrease the bandwidth requirement for transmitting webpage images. The optimization of webpage images does not lower the quality of related original images and does not need any change to the operations at the client side.

The inventive method and system for optimizing web page images is described in detail by way of embodiments, which are merely illustrative rather than restrictive or exhaustive. Those skilled in the art may readily make various modifications and changes to those embodiments without departing from the spirit and scope of the invention.

The invention claimed is:

1. A method for optimizing images of a web page on a network server, comprising:
   detecting a distance measure between the images in a reduced document object model (DOM) tree representation of the web page to determine the relationship among the images;
   in response to the determination of the distance measure relationship among the images, combining two or more related images into a combinational image; and
   updating the web page to replace references to the related images with a reference to the combinational image.

2. The method of claim 1, wherein said detecting the images to determine the relationship among the images further comprises detecting the relationship of the images being commonly referenced by different web pages.

3. The method of claim 2, wherein the step of detecting the relationship of the images being commonly referenced by different web pages further comprises: detecting the relationship of the images being dynamically referenced by different web pages.

4. The method of claim 3, wherein the step of combining the related images into a combinational image comprises combining the images according to the high-to-low order of the similarity of the image accessing pattern.

5. The method of claim 2, wherein the step of combining related images into a combinational image comprises combining the images according to the high-to-low order of their probabilities of being commonly referenced.

6. The method of claim 1, wherein said detecting the images to determine the relationship among the images further comprises detecting the relationship of the images being commonly referenced by different segments of the same web page.

7. The method of claim 1, wherein the step of combining the related images into a combinational image comprises: according to the distance between the images in the DOM tree, combining the images with shorter distance before combing the images with longer distance.

8. The method of claim 1, wherein the step of combining related images into a combinational image comprises:
   traversing the DOM tree representing the web page to combine similar images into the combinational image.

9. The method of claim 1, wherein the sum of the sizes of the two or more related images is less than a predefined combinational image threshold.

10. The method of claim 1, wherein the reference to the combinational image comprises a reference to the file of the combinational image and the position information of the related images in the combinational image.

11. A system for optimizing images of a web page on a network server, comprising:
    image detection means for detecting a distance measure between the images in a reduced document object model (DOM) tree representation of the web page to determine the relationship among the images;
    image combination means, for combining two or more related images into a combinational image in response to the determination of the distance measure relationship among the images; and
    web page updating means, for updating the web page to replace references to said related images with a reference to the combinational image.

12. The system of claim 11, wherein the image detection means comprises:
    image inclusion relationship analysis means for analyzing and recording the relationship of the images being commonly referenced.

13. The system of claim 12, wherein the image combination means comprises one or more of the following:
    web page level image combination means for combining the images according to the relationship of the images being commonly referenced by different web pages;
    segment level image combination means for combining the images according to the relationship of the images being commonly referenced by different segments of the same web page; and,
    website level image combination means for combining the images according to the relationship of the images by the similarity of an image accessing pattern.

14. The system of claim 12, wherein the image combination means combines the images according to the high-to-low order of their probabilities of being commonly referenced.

15. The system of claim 12, wherein the image combination means combines the images according to the distance between the images in the DOM tree by combining the images with shorter distance before combining the images with longer distance.

16. The system of claim 11, wherein the image combination means traverses the DOM tree representing the web page to combine similar images into the combinational image.

17. The system of claim 11, wherein the image combination means combines the two or more related images according to a predefined threshold for the size of the combinational image.

18. The system of claim 11, wherein the web page updating means changes the references to the related images to a reference to the file of the combinational image and the position information of the related images in the combinational image.

19. A computer program product, said computer program product comprising a non-transitory computer readable medium with computer readable code stored thereon which, when executed by the computer, will implement a method for optimizing images of a web page on a network server, said method comprising steps of:

detecting a distance measure between the images in a reduced document object model (DOM) tree representation of the web page to determine the relationship among the images;

in response to the determination of the distance measure relationship among the images, combining two or more related images into a combinational image; and     updating the web page to replace references to the related images with a reference to the combinational image.

* * * * *